United States Patent [19]
Sanz et al.

[11] 3,856,415
[45] Dec. 24, 1974

[54] LIGHT SHIFTING SYSTEM FOR USE IN AN OPTICAL INSTRUMENT, SUCH AS A SPECTROPHOTOMETER

[75] Inventors: Manuel C. Sanz; Georges Revillet, both of Geneva, Switzerland

[73] Assignee: Micromedic Systems, Inc., Philadelphia, Pa.

[22] Filed: Mar. 28, 1973

[21] Appl. No.: 345,804

[30] Foreign Application Priority Data
Apr. 28, 1972 Switzerland.......................... 6419/72

[52] U.S. Cl...................... 356/205, 350/6, 350/285, 356/97
[51] Int. Cl............................. G01j 3/08, G02f 1/34
[58] Field of Search............. 356/51, 88, 89, 93–97, 356/204–206, 211, 212; 350/6, 7, 204, 285

[56] References Cited
UNITED STATES PATENTS
| | | | |
|---|---|---|---|
| 2,730,008 | 1/1956 | McGinn | 350/204 UX |
| 3,463,592 | 8/1969 | Akerman | 356/95 |
| 3,518,011 | 6/1970 | Rochte | 356/181 |
| 3,669,547 | 6/1972 | Sell | 356/97 X |

*Primary Examiner*—Ronald J. Stern
*Assistant Examiner*—F. L. Evans

[57] ABSTRACT

The present invention relates to optical instruments, such as photometers including spectrophotometers, and relates more particularly to a light-shifting device of light refracting type for receiving a beam of light used in such instruments and shifting it into one or the other of two parallel paths.

An optical instrument having a light source, means comprising a diaphragm for directing a collimated beam of light from the light source in a path along an optical axis, light-refracting means disposed in the path for receiving the light beam and shifting the beam from its incident path thereto alternately to each of two offset parallel paths which are parallel to the incident path, and means for supporting, in the offset parallel paths, sample and comparison objects to be scanned by the shifted light beam in those paths.

10 Claims, 2 Drawing Figures

Patented Dec. 24, 1974
3,856,415
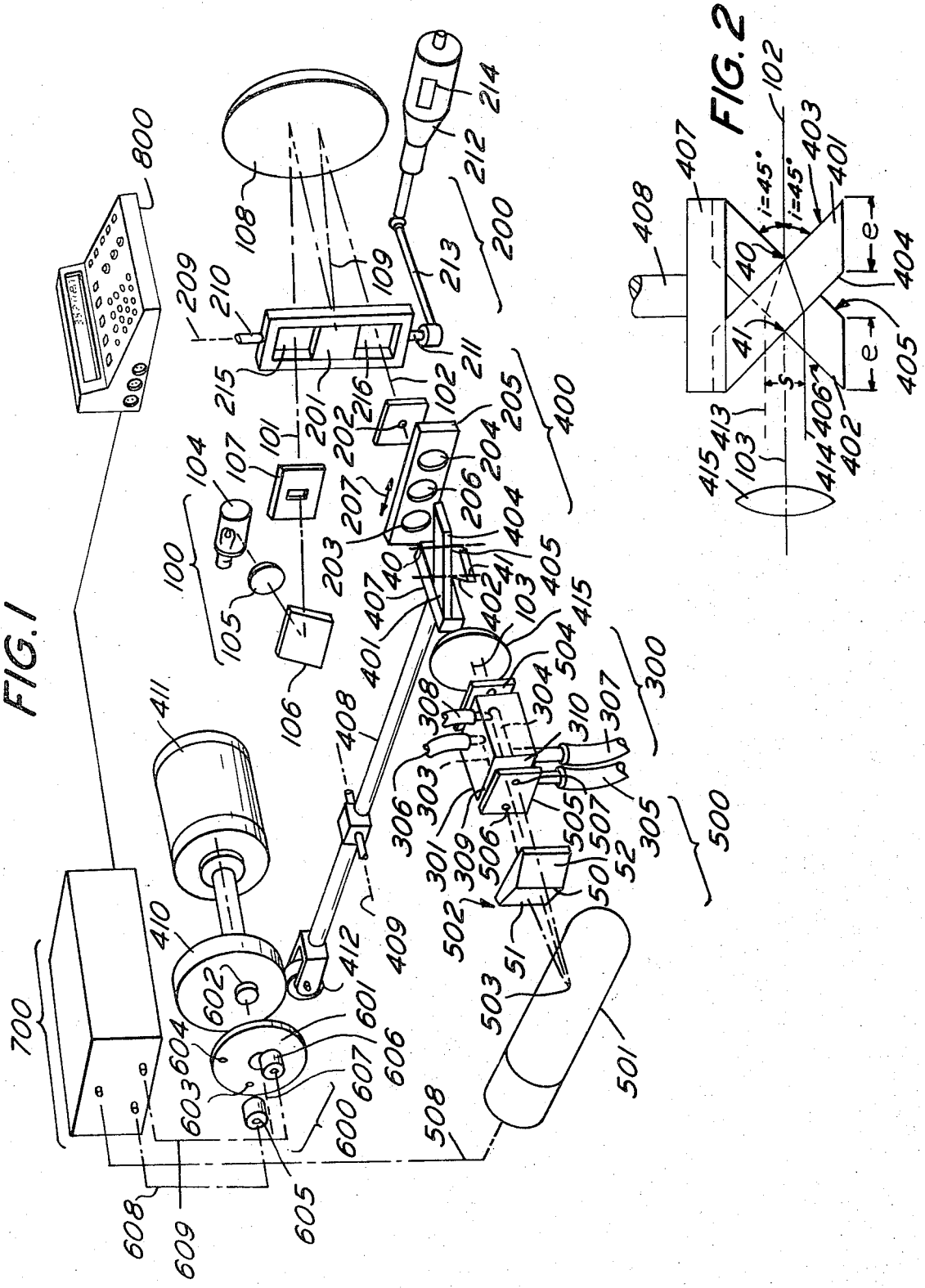

LIGHT SHIFTING SYSTEM FOR USE IN AN OPTICAL INSTRUMENT, SUCH AS A SPECTROPHOTOMETER

DESCRIPTION OF THE INVENTION

It is well known to measure certain optical properties of a substance by determining the attenuation which occurs in a light beam passing through the substance. For making such measurements with photometers, use is generally made of a comparison between the attenuation produced by a sample of the substance and the attenuation produced by a specimen of another substance selected as a standard. This gives a so-called relative measurement of the studied property, i.e., the property of the sample expressed in terms of that of the standard specimen. In order that such a comparison may provide a truly valid measurement, it must be ensured that the intensity of the incident beam impinging on the sample is exactly the same as the intensity of the incident beam impinging on the standard specimen. That is the reason why use is generally made of a single incident beam of which the path is cyclically deflected so that it impinges alternately on the sample and on the standard specimen. Such cyclic deflection, which does not affect the light intensity, can be obtained in various ways. Thus, for example, one may use a rotating mirror to which either a continuous rotation or an angular oscillation is imparted. One may likewise use a plane-parallel plate placed in the path of the incident beam with an angle of incidence which is made to vary. In this latter case, one uses the well-known lateral shifting of a light beam produced by a thick plane-parallel plate, this shift being due to the face that the refractive index of the substance of which the plate is made differs from the refractive index of the ambient air. Whereas, in the case of the mirror, the light beam undergoes a change in direction, in the case of the plane-parallel plate the light beam is subjected only to a lateral displacement and maintains its initial direction. In both cases, however, the beam is deflected in a continuous manner, i.e., it passes through all intermediate positions between its two operative end positions. Now, it is advantageous that the beam should pass as rapidly as possible through these intermediate positions in which it is inoperative, so that it may cooperate as long as possible in a useful manner, in the one or the other end position, with the sample or the specimen respectively. In other words, it is desired that the beam be made to jump to and fro between a first position in which it cooperates with the standard specimen to a second position in which it cooperates with the sample to be measured. To this end, the initial beam is submitted to the action of a device which refracts the incident beam alternately into one of two offset paths parallel to each other and to the initial path. The device shifts the direction of refraction in sudden fashion which might be referred to as an "on-off" action, without gradually changing the angle taken by the refracted beam in passing from one path to the other.

The invention relates more particularly to such an on-off light-beam shifting device for imparting to a light beam an alternate transverse shift perpendicularly to its axis.

The invention concerns also photometers, such as a spectrophotometer, equipped with a light-beam shifting device of the type just described.

The invention is illustrated by the accompanying drawing in which:

FIG. 1 is a diagrammatic perspective view of one embodiment of a spectrophotometer in accordance with the invention, with its casing removed;

FIG. 2 is a plan view of a part of the light-shifting device.

The spectrophotometer shown in FIG. 1 comprises the following main elements:

a. Beam-generating means 100 for producing a beam along a path 101 of collimated light, e.g., white or mixed wavelength light;

b. Monochromator means 200 for selecting from the white or mixed wavelength light beam a monochromatic beam 102 having a selected wavelength, said monochromatic beam being directed along the optical axis 103 of the spectrophotometer;

c. Container means 300 comprising at least one pair of cuvettes of which one serves to receive a reference liquid and the other a liquid sample, the optical absorption of which is to be measured by comparing it with the optical absorption of the reference (when the sample is a solution, the concentration of which is to be measured, the reference for example, may be the solvent, i.e., a "blank" or a "solution" with zero concentration);

d. Shifting means 400 for moving the end portion of said monochromatic beam 102 with respect to the pair of cuvettes, in a direction perpendicular to the axis 103, this relative motion being such that the contents of the two cuvettes are optically scanned, i.e., alternately and periodically illuminated by the monochromatic light beam issuing from the monochromator means 200;

e. Light detector means 500 for delivering electrical signals representing the intensities of the beams that have passed through the sample and the reference (or blank), respectively, at the wavelength selected by the means 200;

f. Synchronization signal-generating means 600 for delivering electric signals or pulses that are synchronous with the positions taken, or paths followed, by the scanning portion of the light beam 102, produced by the shifting means 400, this synchronization signal-generating means therefore being mechanically linked to the shifting means 400;

g. An electronic unit 700 connected to the detector means 500 and to the synchronization signal-generating means 600, this unit being arranged for respectively sorting the signals originating from the blank cuvette and the sample cuvette, for calculating the logarithm of the ratio of these signals, i.e., the optical density of the sample expressed in terms of that of the blank, and for digitizing the signal representing said optical density;

h. A control and display unit 800 for displaying a number proportional to said optical density and representing the concentration of the sample.

The beam generating means 100 comprises a light source in the form of a lamp 104 which may generate white light, a condensor lens 105, a plane mirror 106, a diaphragm 107 having an aperture in the form of a slit, and a concave spherical mirror 108. This mirror reflects the beam passing through the diaphragm along path 101 onto a grating 201 that is a part of the monochromator means, and reflects the monochromatic beam issuing from the grating along path 109 in the direction of the optical axis 103, thus generating the light beam in the path 102.

The monochromator means 200 comprises a grating plate 201 for selecting from the white beam 101 a monochromatic beam 109, a diaphragm having an aperture in the form of a circular hole 202 and two optical filters 203 and 204 respectively mounted in two openings at the ends of a slide 205 provided with three openings of which the central one 206 is empty. The slide 205 is glidingly mounted in a fixed slideway (now shown) in order to allow transverse movement thereof in the direction of the double arrow 207 so that any one of the three openings can be selectively placed in the path 102 of the monochromatic beam. The grating plate 201 is mounted in a vertical supporting frame 208 rotatable about a vertical axis 209 defined by two pivots 210, 211 engaged in two fixed bearings (not shown). The opening in the frame 208 is greater in the vertical direction than the grating plate 201 itself, thus permitting an adjustment of its vertical position, and providing upper and lower passages 215 and 216 which are, respectively, transversed by the beam path 101 and the monochromatic beam path 109. The angular position of the frame 208 and hence the wavelength of the monochromatic beam directed along path 109 are selected by a micrometric screw 212 connected to the frame by a link 213. The micrometric screw is provided with a window 214 in which appears the numeral indicative of the selected wavelength of the monochromatic beam in path 102. The role of the filters 203, 204 is to prevent extraneous parasitic light, e.g., stray light or second order diffraction light from the grating plate 201, from impinging on the cuvettes when the wavelength selected by the grating plate 201 lies in the red and near infrared range or in the ultraviolet range; for a wavelength in most of the visible range there is no need for this precaution. Thus the filter 203 has its band width in the UV region and cuts any radiation having a wavelength greater than, say, 420 millicrons; it is made operative when the beam in path 102 has its selected wavelength in the ultraviolet range, i.e., shorter than, say 400 millimicrons. Similarly, the filter 204 has its band width in the longer wavelength visible and infrared (IR) region and cuts any radiation having a wavelength shorter than, say, 550 millimicrons; it is made operative as soon as the beam along path 102 has its selected wavelength in the red or near IR range.

The container means 300 takes the form of one pair of separate cuvettes such as cuvettes 301 and 302. These cuvettes, of which the one (e.g., cuvette 301) is for receiving a reference liquid (or the "blank") and the other (e.g., the cuvette 302) is for receiving the sample liquid, are both of the flow-through type each having a cylindrical cavity 303 and 304, respectively; these cavities, shown by thin broken lines, have axes which are parallel to the optical axis 103 and are situated in a horizontal plane containing this axis, symmetrically with respect to the axis. The cavities 303 and 304 are connected by flexible tubes 305 and 306, 307 and 308, respectively, to sources and drains for reference (or blank) liquid and for sample liquid, respectively. Conventional pumping means (not shown) may be provided for supplying the liquids to their respective cuvettes. This feeding action is generally intermittent, i.e., the cuvettes are filled, and liquid renewal takes place after a certain time has elapsed, during which the measurement is made. However, continuously operating pumping means may also be used in some cases (e.g., when the liquids are sufficiently homogeneous and so long as the renewal speed is not too high). The front faces (not visible) and the rear faces 309 and 310 of the cuvette are made optically flat and parallel to each other for preventing any changes in direction of the beam paths through the cuvettes as they enter and leave, the beams impinging perpendicularly on the front faces and emerging perpendicularly from the back faces.

The shifting means 400 consists of a pair of plane-parallel members 401 and 402, such as plates of transparent material, such as of quartz, plastic, or glass. These two transparent members 401 and 402 have rectangular cross-sections, one of the members being mounted adjacent the other in overlapping and crosswise relationship to the other (in superposition as shown) with the front faces of the two members lying in separate planes of a dihedral angle, the vertex 40 of which lies in and extends through both front faces. The back faces also lie in separate planes of a dihedral angle having a vertex 41. Each member has a relatively great "thickness" $e$ measured in the direction of the optical axis 103 (see FIG. 2, representing a view from the top). These members or plates are each plane-parallel, i.e., the front or entrance face 403 and the back or exit face 404 of the plate 401 are parallel, as are the entrance face 405 and the exit face 406 of the plate 402. Both plates are mounted in a support 407 in such a manner that their planes of incidence (determined by the incident beam 102 and the normal to the entrance plane) are parallel and that the planes of the front or entrance faces 403, 405 of both plates (and consequently the planes of their exit faces 404, 406) are equally inclined with respect to the incident beam 102 (i.e., the beam lies in the plane which bisects their dihedral angle). In the embodiment shown these equal inclinations are $i = 45°$, so that in that case the planes of the entrance faces are mutually perpendicular. The support 407 is held at one end of a lever 408 pivoting about a horizontal fixed axis 409 under the action of an eccentric 410 driven by a motor 411 and acting on the other end of this lever through a roller 412. The assembly of optical plates 401 and 402 thus describes an up and down movement, so that they are inserted alternately in the path 102 of the incident beam. In accordance with the law of refraction of a light beam in a plane-parallel plate, the incident beam is translated in the plane of incidence, the shift thus produced depending on the refractive index of the glass constituting the plate, on the thickness $e$ of the plate and on the angle of incidence $i$. Consequently, the outgoing beam is made to jump alternately from one path 413 shifted to the right with respect to the incident beam 102 (as shown by the broken line in FIG. 2) to another path 414 shifted to the left (as shown by a plain line in FIG. 2), both outgoing beams being parallel to each other and to the incident beam 102. For a given angle of incidence $i$, the value of the distance $s$ between paths 413, 414 depends on the thickness $e$ of the plates. Due to the symmetry, the paths 413, 414 of the outgoing beams are contained in a horizontal plane passing through that of the incident beam 102 and they are symmetrically placed with respect to the optical axis 103. The refractive index of the glass (or other material) of the plates 402, 403 and their thickness $e$ are so chosen that the paths 413, 414 coincide with the axes of the cavities 303, 304 of the cuvettes 301, 302, so that the incident (monochromatic) beam 102 is made to jump alternately from one cavity to the other. A lens 415 (FIG. 2) is provided to improve collimation of the refracted beam before it enters a respective cuvette.

The light detector means 500 comprises essentially a photomultiplier tube 501 coupled with an optical double prism 502. The latter is a symmetrical transparent body of glass, silica, quartz, or plastic material having a plane face arranged at right angles to the paths 413 and 414 to receive the light beam in either path perpendicularly and another face formed of two symmetrically arranged planes 51 and 52 which form an obtuse dihedral angle, the linear vertex 50 of which is arranged to lie in a vertical plane in which the axis 103 also lies. The two planes of the dihedral angle make equal angles with a vertical plane through the axis 103. The double prism is situated in the paths 413, 414 of the beam going out of the container means 300 and is placed in such a position that each refracted beam proceeds through the same thickness of the prism which refracts them back toward the axis 103 and directs them to the same point 503 on the photocathode of the multiplier 501. With such an arrangement, the beam issuing from the blank cuvette 301 and the beam issuing from the sample cuvette 302 alternately excites the phototube 501 and, owing to the fact that they impinge on the same point 503, on the photocathode, the sensitivity of the photoelectric conversion is the same for both. Two diaphragm plates 504 and 505, each provided with two apertures, such as the holes 506 and 507 in the plate 505, are placed one on each end of the container means 300, the holes being in alignment with the axes of the cuvette cavities 303 and 304 respectively. These diaphragms are provided in order to prevent parasitic light arriving from the side from falling on the phototube 501, so that the signal delivered by the latter is attributable only to one of the refracted monochromatic beams in either path 413 or path 414 derived from the monochromatic beam in path 102. The multiplier phototube 501 is electrically connected to the electronic unit 700, this connection being depicted by a line 508.

The synchronization signal-generating means 600 is intended for delivering signals indicating on which of the paths 413 or 414 the scanning beam lies. It comprises a disc 601 driven by the same shaft 602 as the eccentric 410 and provided with two permanent magnets 603 and 604 situated at 90° to each other. In front of the disc 601 two fixed coils 605, 606 are arranged in diametrically opposite positions with respect to the common trajectory of the magnets 603, 604 and at a distance from the axis 607 of the disc 601 equal to that of these magnets. With this arrangement, each coil delivers an electric signal or pulse each time a magnet passes in front of it during rotation of the eccentric 410. The angular positions of the coils with respect to the axis 607 and those of the magnets with respect to the eccentric 410 are so chosen that four pulses are generated at each rotation of the latter, two of them corresponding to the "dead-center" points i.e., the extreme positions of the angular movement of the lever 408 and the two other pulses being in quadrature with the first ones. Both coils are connected to the electronic unit 700, as diagrammatically represented by lines 608 and 609 in FIG. 1.

We claim:

1. A device, adapted to be used in optical instruments for shifting a light beam from an incident path alternately to each of two offset parallel emergent paths which are parallel to the incident path, comprising two transparent members, each having parallel front and back surfaces, the distance from the front to the back surface being the same in each member, one of the members being mounted in cross-wise relationship adjacent the other with the front faces of the two members lying in the separate planes of a dihedral angle, the vertex of which is a straight line which lies in the plane bisecting the angle, a reciprocable support, the transparent members being mounted on the support so that the optical axis of the incident light beam lies in the plane bisecting the dihedral angle with the vertex in the path of the incident light beam and perpendicular to the optical axis of the incident beam, and means for reciprocating the support, with the transparent members mounted thereon, in a direction generally parallel to the vertex to alternately interpose the front face of one member and then that of the other into the path of the incident beam.

2. A device according to claim 1 in which the transparent members are in the form of bars fixedly secured to the reciprocable support.

3. A device, adapted to be used in optical instruments for shifting a light beam, especially a collimated light beam having a limited cross-sectional area resulting from passage through an aperture of a diaphragm, from an incident path alternately to each of two offset parallel emergent paths which are parallel to the incident path, comprising two transparent members, each having a rectangular cross-section and parallel front and back surfaces, the distance from the front to the back surface being the same in each member, one of the members being mounted adjacent the other in overlapping and cross-wise relationship to the other with the front faces of the two members lying in the separate planes of a dihedral angle, the vertex of which is a straight line which lies in the plane bisecting the dihedral angle, a reciprocable support, the transparent members being mounted on the support so that the optical axis of the incident light beam lies in the plane bisecting the dihedral angle with the vertex in the path of the incident light beam and generally perpendicular to the optical axis of the incident beam, and means for reciprocating the support, with the transparent members mounted thereon, in a direction generally parallel to the vertex to alternately interpose the front face of the one member and then that of the other into the path of the incident beam.

4. A device according to claim 2 in which the transparent members are in the form of plates fixedly secured to the reciprocable support.

5. An optical instrument having a light source, means comprising a diaphragm for directing a collimated beam of light from the light source in a path along an optical axis, a device disposed in the path for receiving the light beam and shifting the beam from its incident path thereto alternately to each of two offset parallel issuing paths which are parallel to the incident path, and means for supporting, in the offset parallel paths, sample and comparison objects respectively to be scanned by the shifted light beam in those paths, said device comprising two transparent members, each having parallel front and back surfaces, the distance from the front to the back surface being the same in each member, one of the members being mounted in crosswise relationship adjacent the other with the front faces of the two members lying in the separate planes of a dihedral angle, the vertex of which is a straight line which lies in the plane bisecting the angle, a reciprocable support, the transparent members being mounted on the support so that the optical axis of the incident light beam lies in the plane bisecting the dihedral angle with the vertex in the path of the incident light beam and perpendicular to the optical axis of the incident beam, and means for reciprocating the support, with the transparent members mounted thereon, in a direction generally parallel to the vertex to alternately interpose the front face of one member and then that of the other into the path of the incident beam.

6. An instrument in accordance with claim 5 which is a photometer and the sample and comparison supporting means comprises cuvette means having two adjacent cavities for receiving a liquid sample to be tested and a reference liquid respectively, the cavities being disposed in alignment with the offset paths.

7. A photometer in accordance with claim 6 comprising a photomultiplier tube for receiving light from the cavities and converting it into an electrical pulse or signal, and means for directing the light from the cavities to essentially the same spot on the tube.

8. A photometer in accordance with claim 7 comprising display means, electronic means responsive to the signal from the tube to transmit a signal for registering an optical measurement, indicative of the signal received by the photomultiplier tube, in the display means.

9. An instrument according to claim 8 comprising signal-generating means driven in synchronization with the shifting means to indicate from which emergent path the light received by the photomultiplier is coming from.

10. An optical instrument in accordance with claim 5, wherein the transparent members of the light beam shifting device are in the form of plates each having a rectangular cross-section, fixedly secured to the reciprocable support.

* * * * *